March 15, 1955   W. W. CUSHMAN   2,704,143
ROLLER CONVEYOR
Filed Nov. 24, 1950
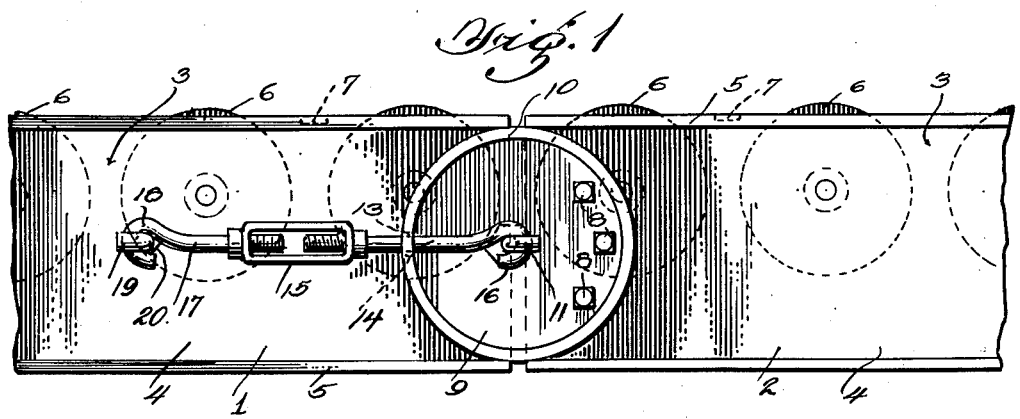
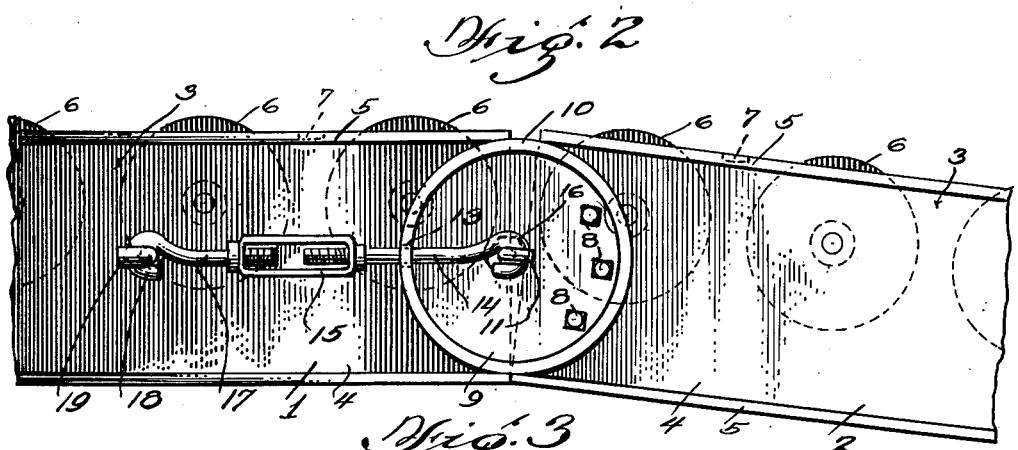
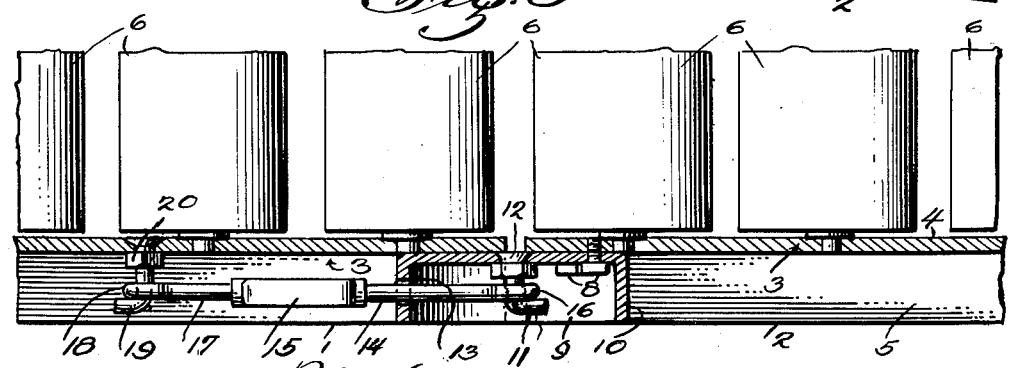
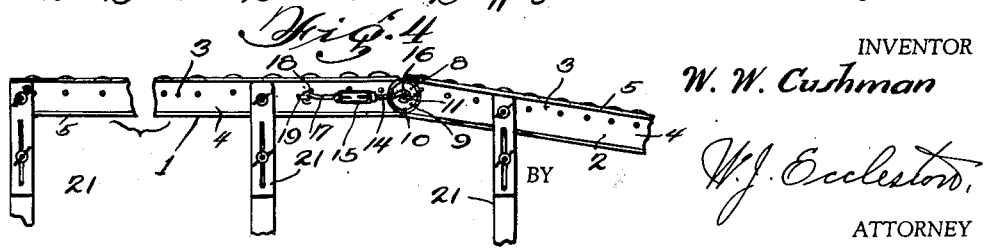
INVENTOR
W. W. Cushman
BY W. J. Eccleston
ATTORNEY

United States Patent Office 2,704,143
Patented Mar. 15, 1955

2,704,143

ROLLER CONVEYOR

Walton W. Cushman, Webb City, Mo.

Application November 24, 1950, Serial No. 197,475

7 Claims. (Cl. 193—35)

(Granted under Title 35, U. S. Code (1952), sec. 266)

The invention described herein, if patented, may be manufactured and used by or for the Government for governmental purposes, without the payment to me of any royalty thereon.

This invention relates to conveyors of the multiple section type and especially to roller conveyors of that type. The side frames of such conveyors are usually formed of channel irons which are positioned with their bases toward each other and with their flanges directed outwardly. Conveyor sections of this type may be readily connected to form a straight conveyor by conventional couplings. But considerable difficulty has been encountered in connecting conveyor sections at a vertical angle to each other so that relative vertical movement between the juxtaposed ends of adjoining sections is prevented.

An object of the present invention resides in the provision of a novel joint or connection between the ends of conveyor sections of the type referred to by means of which the conveyor sections will be firmly held in any vertical angular relationship to which they may be adjusted despite long and hard usage of the conveyor.

Another object of the invention resides in the provision of a novel means for connecting the adjacent ends of conveyor sections so that they may be drawn together and securely held in proper position even though the vertical angular relationship between the sections may vary between relatively wide limits.

Other objects and advantages of the invention will be apparent from the following description taken in connection with the accompanying drawings, in which:

Figure 1 is a side elevational view of the novel means for uniting two sections of a roller conveyor of more or less conventional form, the sections being positioned in a horizontal plane;

Figure 2 is a similar view showing the joint with the two sections arranged at a vertical angle to each other;

Figure 3 is a longitudinal sectional view through one side of the construction as arranged in Figure 1; and Figure 4 is a side elevational view (with parts broken away) of a roller conveyor embodying the present invention, and supported in position for use.

Referring to the drawings in greater detail, the sections of the more or less conventional roller conveyor are indicated by the numerals 1 and 2 and each section includes a frame formed of channel members 3. The channel members forming each frame are arranged with their bases 4 facing inwardly and their flanges 5 directed outwardly, as indicated. Rotatably mounted in each section is a series of conventionally arranged rollers 6 having one portion thereof disposed slightly above the flanges 5 on one surface of each conveyor section, and the side members 3 are securely braced and anchored together by the cross bars 7.

Securely fixed to each side member of a section at one end thereof as by bolts or rivets 8 is an extension member 9, here shown as in the form of a disc provided with an outwardly directed circumferential flange 10 having a width corresponding substantially to the width of the flanges 5 on the side members 3. These extension members, including the flanges 10, have a diameter slightly greater than the distance between a pair of flanges 5, and are positioned as indicated in Figures 1 and 2 so that the upper exposed portion of the flange 10 constitutes an approximate continuation of the upper flange 5 of the side member 3, when the conveyor sections are arranged in substantial alignment or are arranged at a vertical angle to each other, as indicated in Figure 2.

Each disc 10 is provided with a centrally disposed anchoring element or hook 11 extending outwardly thereof and secured in position by any type of fastening means such as nut and bolt connections 12. The anchor or hook 11 is disposed within the contour of the flanged disc 9, and the flange 10 may be provided with an aperture 13 to permit the extension therethrough of one arm 14 of a turnbuckle 15. The arm 14 is preferably provided with an eye 16 for engaging over the hook 11, and the opposite arm 17 of the turnbuckle connection is provided with an eye 18 for engagement over a hook 19 which is fixedly secured to the adjacent side member of the conveyor section 1 by means of bolt and nut connections 20.

When placed in position for use the conveyor sections are preferably supported on adjustably mounted legs 21, as indicated in Figure 5.

As is clearly shown in Figures 1 and 2 of the drawing, the diameter of the discs fixed at each side of the conveyor section 2 and their relation to the longitudinal axis of the conveyor section are such that the flanges 10 form an approximate continuation of the flanges 5, and this relationship is maintained regardless of the vertical angular position between the adjacent conveyor section. Also, by reason of the centrally disposed anchoring means 11 on each disc or extension member 9 it will be apparent that the vertical angular arrangement of the sections may be altered from time to time without completely disconnecting the sections. Moreover, by reason of the flanges 10 which form substantial continuations of the flanges 5 of the side members of the conveyor sections, it will be apparent that the flanges 10 are brought into a tight wedging engagement with the flanges 5 when the turnbuckles 15 are tightened up after the proper angular relationship between the sections is determined. This clamping or wedging action between the arcuate flanges 10 and the straight flanges 5 provides an extremely rigid connection between the ends of the adjacent sections so that the desired angular relationship between the sections may be maintained at all times regardless of the duration of use of the conveyor or the degree of wear and tear.

In accordance with the patent statutes I have described what I now consider to be the preferred embodiment of the invention, but since various changes may be made in structural details without departing from the spirit of the invention, it is intended that all such changes be included within the scope of the appended claims.

I claim:

1. A roller conveyor section comprising flanged side members, and arcuate extensions rigidly fixed to the side members at one end of the section and extending beyond the respective ends of the members, said arcuate extensions having a diameter slightly greater than the distance between the flanges of the side member.

2. A roller conveyor section comprising flanged side members, and flanged discs rigidly fixed to the side members at one end of the section and extending beyond the respective ends of the members, each disc having a diameter slightly greater than the distance between the flanges of its side member.

3. A roller conveyor section comprising flanged side members, flanged discs arranged with their flanges directed outwardly, and means for rigidly securing said discs to the respective ends of the side members at one end of the section, portions of the flanges of the discs extending beyond the flanges of the side members and forming extensions thereof.

4. A roller conveyor section comprising flanged side members, flanged discs arranged with their flanges directed outwardly, means for rigidly securing said discs to the respective ends of the side members at one end of the section, portions of the flanges of the discs extending beyond the flanges of the side members and forming extensions thereof, each disc having a diameter slightly greater than the distance between the flanges of its side member and anchoring means secured to the centers of said discs.

5. A roller conveyor composed of at least two sections each formed of a pair of flanged side members, rollers rotatably mounted between the side members of each section, flanged extension members on the respective ends of the side members at the end of one section, the distance between the flanges of each flanged extension being slightly greater than the distance between the flanges of each side member, anchoring means on said side members, turnbuckles connected to the side members on the adjacent end of the other conveyor section, and anchoring means on the free ends of said turnbuckles for coaction with the anchoring means on said extension members.

6. A roller conveyor composed of at least two sections each formed of a pair of flanged side members, rollers rotatably mounted between the side members of each section, flanged extension members on the respective ends of the side members at the end of one section, the distance between the flanges of each flanged extension being slightly greater than the distance between the flanges of each side member, anchoring means on said side members, turnbuckles connected to the side members on the adjacent end of the other conveyor section and extending through apertures formed in the flanges of the extension members, and anchoring means on the free ends of said turnbuckles for coaction with the anchoring means on said extension members.

7. A roller conveyor composed of at least two sections each formed of a pair of flanged side members, rollers rotatably mounted between the side members of each section, discs secured to the respective ends of the side members at one end of one of said sections, portions of the discs extending beyond the adjacent ends of the side members, the diameter of the disc being slightly greater than the distance between the flanges of a side member, anchoring means fixed to the centers of said discs, turnbuckles connected to the side members on the adjacent end of the other conveyor section, and anchoring means on the free ends of said turnbuckles for coaction with the anchoring means on said discs.

References Cited in the file of this patent

UNITED STATES PATENTS

| | | |
|---|---|---|
| 252,960 | Moore | Jan. 31, 1882 |
| 840,189 | Alvey | Jan. 1, 1907 |
| 2,347,308 | Woldring et al. | Apr. 25, 1944 |
| 2,438,527 | Werner | Mar. 30, 1948 |